United States Patent [19]

Matsuyama et al.

[11] Patent Number: 5,633,739
[45] Date of Patent: May 27, 1997

[54] COLOR LIQUID CRYSTAL DISPLAY DEVICE COMPOSED OF COLOR FILTER WITH A LAYER OF THREE PRIMARY COLOR ARRAY PATTERNS FABRICATED BY THERMAL DYE TRANSFER TECHNOLOGY

[75] Inventors: Shigeru Matsuyama; Hiroaki Asuma, both of Mobara, Japan

[73] Assignee: Hitachi, Ltd., Tokyo, Japan

[21] Appl. No.: 550,081

[22] Filed: Oct. 30, 1995

[30] Foreign Application Priority Data

Nov. 7, 1994 [JP] Japan ................... 6-272379

[51] Int. Cl.$^6$ .................... G02F 1/1335; G02F 1/1333; G03F 9/00
[52] U.S. Cl. .................... 349/106; 430/7; 349/110; 349/122; 349/138
[58] Field of Search .................. 359/68, 67, 74, 359/79; 430/7, 20

[56] References Cited

U.S. PATENT DOCUMENTS

| | | | |
|---|---|---|---|
| 3,968,270 | 7/1976 | Hasegawa | 427/13 |
| 4,725,482 | 2/1988 | Komoda et al. | 428/215 |
| 4,802,743 | 2/1989 | Takao et al. | 359/68 |
| 5,061,567 | 10/1991 | Brochot et al. | 428/428 |
| 5,358,810 | 10/1994 | Yoshino | 430/20 |
| 5,402,141 | 3/1995 | Haim et al. | 359/68 |
| 5,454,861 | 10/1995 | Hasegawa et al. | 106/2 |
| 5,495,534 | 2/1996 | Jo | 359/68 |
| 5,506,707 | 4/1996 | Segawa | 359/74 |

*Primary Examiner*—Anita Pellman Gross
*Assistant Examiner*—Toan Ton
*Attorney, Agent, or Firm*—Antonelli, Terry, Stout & Kraus, LLP

[57] ABSTRACT

A color liquid crystal display device comprising a color filter having a structure including a black matrix BM formed on a transparent substrate, a colored layer FIL colored into at least three primary colors and formed by thermal dye transfer technology, a protective area for protecting against dye diffusion filling the gaps between the colored patterns, a transparent protective overcoat PSV2 formed on the colored layer and a transparent conductive electrode ITO2 formed on the transparent protective overcoat. The protective area against dye diffusion is constituted of a not-colored part FIL(T) of a dye receiving layer, protective overcoats PSV2 and PSV3, or of a black matrix with a high heat resistance. Moreover, the protective film is made from a metal-containing organic silicon compound that can be hardened by light or heat.

26 Claims, 14 Drawing Sheets

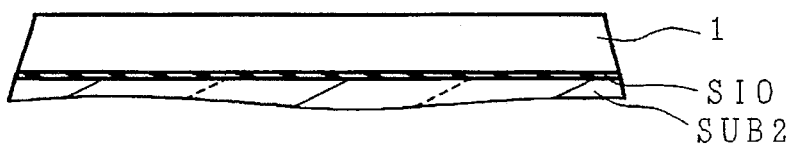
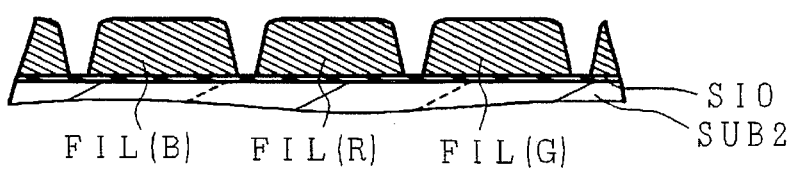
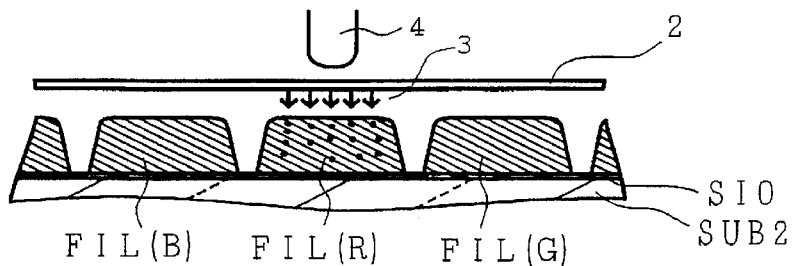
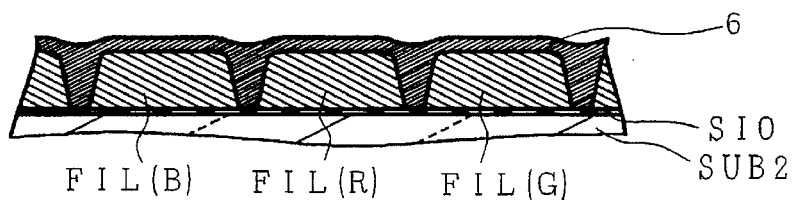
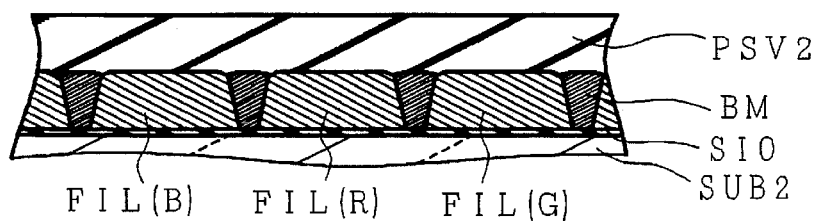
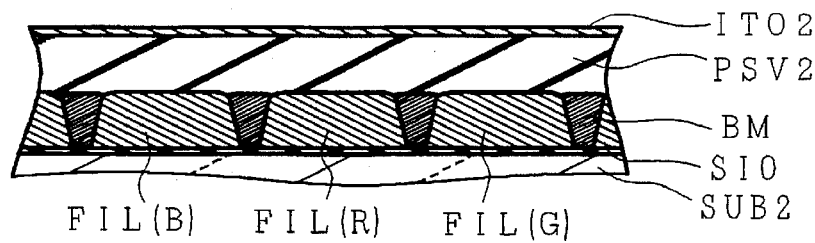

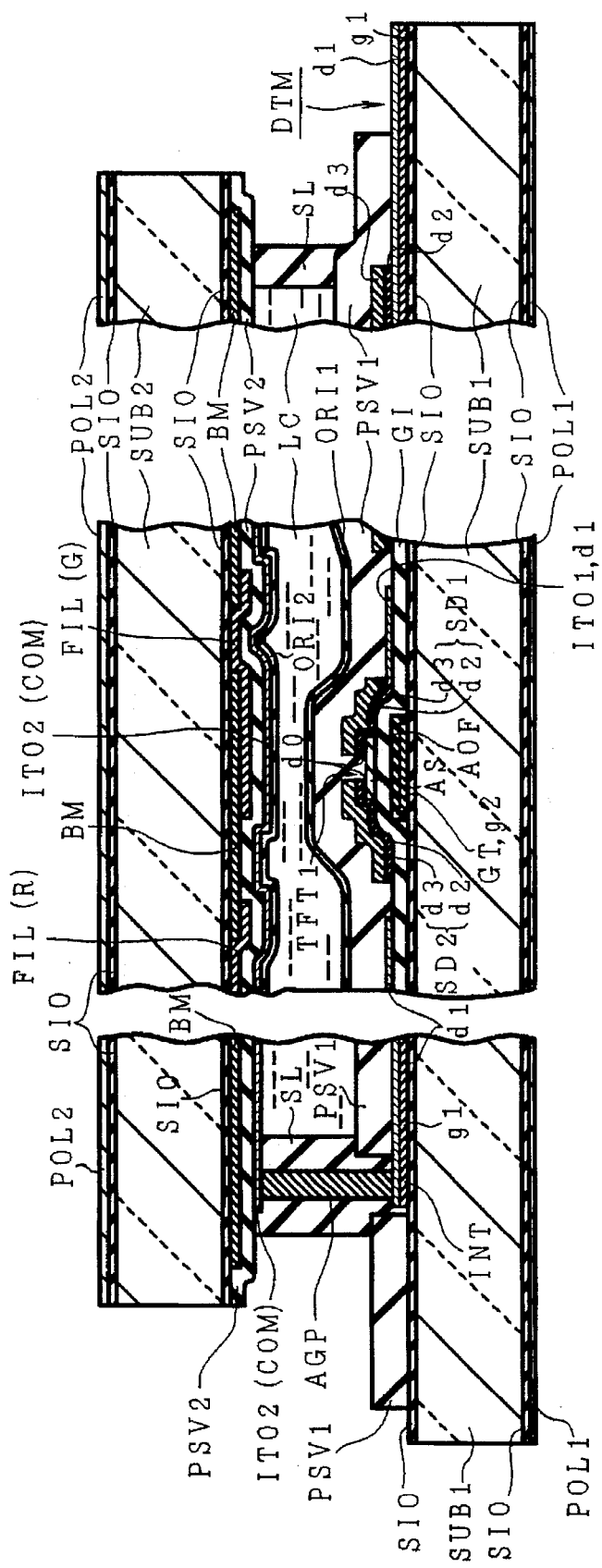

COLOR LIQUID CRYSTAL DISPLAY DEVICE COMPOSED OF COLOR FILTER WITH A LAYER OF THREE PRIMARY COLOR ARRAY PATTERNS FABRICATED BY THERMAL DYE TRANSFER TECHNOLOGY

BACKGROUND OF THE INVENTION

1. Field of the Invention

The present invention relates to a color liquid crystal display device, particularly to a color liquid crystal display device provided with a color filter fabricated by employing the principle of thermal dye transfer technology.

2. Description of the Prior Art

The liquid crystal display is classified into a simple matrix type and an active matrix type according to the pixel selection method.

The simple matrix type liquid crystal display has two sets of electrodes arranged crosswise to each other with the liquid crystal such as STN in between, and forms pixels at cross sections of the electrodes.

The active matrix type liquid crystal display, on the other hand, has nonlinear devices (switching devices) provided in one-to-one correspondence to individual matrix-arranged pixel electrodes. Because the liquid crystal at each pixel is theoretically activated at all times (duty ratio of 1:1), the active type has good contrast compared with the simple matrix type that employs a time-division drive system. The active type therefore is becoming a technology essential to a color liquid crystal display in particular. Thin-film transistors (TFT) are known as typical switching devices.

The basic structure of a color liquid crystal display comprises a substrate on which a common pixel electrode is formed, another substrate on which individual electrodes or switching devices are formed, and a liquid crystal composition sealed between these substrates, with the first substrate provided with color filters.

FIG. 15 is an exploded perspective view showing components of a liquid crystal module that uses a TFT type liquid crystal display as an example of the color liquid crystal display that applies this invention. Denoted SHD is a framelike shield case (metal frame) made of a metal plate; LCW a liquid crystal display window as a display area in the shield case; PNL a liquid crystal display panel; SPB a light dispersing plate; MFR an intermediate frame; PCB3 an inverter circuit; BL a backlight; BLS a backlight support; and LCA a lower case. These components are stacked in a vertical relationship shown in the figure to form a liquid crystal module MDL.

The module MDL is held firmly together by claws CL and hooks FK provided to the shield case SHD.

The intermediate frame MFR is rectangular to form an opening corresponding to the display window LCW, and its frame portion is provided with the light dispersing plate SPB, the backlight support BLS, depressed and raised portions conforming to shapes and thicknesses of various circuit components, and openings for dissipating heat.

The lower case LCA also serves as a reflector for backlight and is formed with reflection ridges RM opposing the fluorescent lamps BL to ensure efficient reflection.

The backlight may be produced by other than the back illumination type shown in the figure. For example, a side illumination type may be employed in which a light source is arranged on the side of the liquid crystal display panel PNL. In this case, a planar light source structure is used which consists mainly of a light conducting body located under the light dispersing plate SPB.

FIGS. 14(a) to 14(c) show sectional views of a conventional active-matrix color liquid crystal display device which represents an example of a color liquid crystal display device of the type to which the present invention is directed. As shown in the drawing, a bottom transparent glass substrate SUB1 and a top transparent glass substrate SUB2 are provided on respective sides of a liquid crystal layer LC. Moreover, a thin-film transistor TFT1 comprising a gate electrode GT, gate insulating films AOF and GI, a semiconductor layer AS, and source and drain electrodes SD1 and SD2, and a transparent conductive electrode ITO1 are formed on the transparent glass substrate SUB1 side, and moreover a transparent protective overcoat PSV1 and a lower orientation film ORI1 are formed in order. A light-shielding film BM serving as a black matrix, color filters FIL(R), FIL(G), and FIL (B), a transparent protective overcoat PSV2, a common transparent conductive electrode ITO2(COM), and an upper orientation film ORI2 are formed in order on the inside surface (liquid crystal LC side) of the top transparent glass substrate SUB2. Silicon oxide films SIO formed through dipping are provided on both sides of the transparent glass substrates SUB1 and SUB2. A sealing pattern SL is formed along the perimeters of the substrates SUB1 and SUB2 and between the transparent glass substrates SUB1 and SUB2 so as to seal the liquid crystal LC except for a liquid crystal sealing hole. The sealing material is made of, for example, an epoxy resin. The common transparent conductive electrode ITO2(COM) on the top transparent glass substrate SUB2 side is connected to a lead wire INT formed on the bottom transparent glass substrate SUB1 side by a silver paste material AGP at least at one portion of the four corners of a panel in this embodiment. The lead wire INT is formed using the same fabrication process as that of a gate terminal, which is not illustrated, and a drain terminal DTM.

The orientation films ORI1 and ORI2, the transparent conductive electrode ITO1, and the common transparent conductive electrode ITO2 are formed inside the sealing pattern SL. Polarizing plates POL1 and POL2 are formed on the outside surfaces of the bottom transparent glass substrate SUB1 and the top transparent glass substrate SUB2, respectively. The liquid crystal LC is sealed in a space defined by the sealing pattern SL between the upper orientation film ORI1 and the lower orientation film ORI2, both for setting the orientation of the liquid crystal molecules. The lower orientation film ORI1 is formed on the transparent protective overcoat PSV1.

The liquid crystal display device of the present invention is fabricated by forming various layers on the bottom transparent glass substrate SUB1 side and the top transparent glass substrate SUB2 side separately, forming the sealing pattern SL on the substrate SUB2 side, joining the bottom transparent glass substrate SUB1 and the top transparent glass substrate SUB2 together, pouring liquid crystal LC through an opening of the sealing material SL, closing the sealing hole with epoxy resin or the like, and cutting the top and bottom substrates.

Therefore, the i-type semiconductor layer AS of the thin-film transistor TFT1 is sandwiched by the light-shielding film BM thereabove and the slightly large gate electrode GT thereunder so that it is shielded from external natural light or backlight. The light-shielding film BM is formed like a grid around each pixel element (so-called black matrix) and the effective display area of each pixel element is defined by the grid. Therefore, the contour of each pixel element is made clear by the light-shielding film BM and the contrast is improved. That is, the light-shielding film BM has two functions: shielding of the i-type semiconductor layer AS from light and a black matrix.

The light-shielding film BM, as shown in FIGS. 14(a) and 14(c), is formed like a frame also at the periphery, and its pattern is formed continuously with a pattern of a matrix section having dot-like openings. The light-shielding film BM at the periphery is extended to the outside of the sealing section SL to prevent leakage light, such as reflected light attributive to an apparatus mounted with this crystal display device, such as a personal computer, from entering the matrix section. Moreover, the shielding film BM is formed 0.3 to 1.0 mm inside from the edge of the substrate SUB2 so as to avoid the cut area of the substrate SUB2.

An active-matrix liquid crystal display device using a thin-film transistor is disclosed, for example, in Japanese Patent Laid-Open No. 309921/1988 and "Jocho koseiwo saiyoshita 12.5-type akutibu matorikusu hoshiki kara ekisho disupurei", Nikkei Electronic, pp. 193–210, issued by Nikkei McGraw-Hill Inc., Dec. 15, 1986. The disclosed embodiment is of an active matrix type. However, the light-shielding black matrix pattern BM is not always necessary for a color liquid crystal display device using an inexpensive super-twisted nematic (STN) liquid crystal or a twisted nematic (TN) liquid crystal because thin-film transistors are not used. The present invention relates to an ordinary color liquid crystal display device. Therefore, also in this case, the present invention can be applied to processes other than the black matrix process.

Conventionally, to form a color filter for a liquid crystal display device, the dyeing method, pigment dispersion method, electrodeposition method, and printing method have been used so far, which mainly involve a photolithography technique. FIG. 16 shows a fabrication method according to the pigment dispersion method using a photolithography process which is most popular among these methods. The BM forming process includes a process for forming a metallic chromium film or the like on a black matrix and thereafter forming a pattern by photoetching, and a process for adding a black colorant to a photosensitive resist, coating it and thereafter forming a pattern by photolithography. In the process for forming pixel elements of a color filter array, photosensitive resist containing pigment particles is coated and thereafter exposure and development are repeated for red (R), green (G), and blue (B) to form a pattern.

FIG. 17 shows a structural sectional view of a general color filter formed by the fabrication method shown in FIG. 16. In FIG. 17, symbol ITO2 denotes a transparent conductive electrode formed on the color filter surface, PSV2 denotes a transparent protective overcoat formed on colored layers, in which FIL(R), FIL(G), and FIL(B) denote colored pixel elements, SUB2 denotes a glass substrate, and BM denotes a black matrix. A silicon oxide film SIO may not be formed depending on the purpose or the material of the transparent substrate SUB2.

As shown in FIG. 17, the color filter normally has a structure in which the protective overcoat layer PSV2 is formed on the colored layers FIL(R), FIL(G), and FIL(B) whose pattern area is separated like a mosaic, a vertical or horizontal stripe for each pixel element or each color, and moreover, the transparent conductive electrode ITO2 is formed on the layer PSV2. By forming the above color filter structure, it is possible to improve the heat resistance of the color filter to a temperature close to 200° C. due to vapor deposition and sputtering in forming the transparent conductive electrode ITO2, and the thermal treatment in the module process after the vapor deposition and sputtering up to a level in which the color filter can practically be used, and thereby a color filter with a high color reproducibility is formed.

Methods for simultaneously performing formation of three primary colors have been studied for practical use in order to reduce the fabrication cost and improve the productivity. The thermal dye transfer technology is one of these methods. The thermal dye transfer technology applied to color printing used for color copying machines and video printers will be described below. FIG. 18(a) shows the fabrication process and FIG. 18(b) shows a typical example of the fabrication system. The resist applying process is a process for forming image receiving paper. In the case of this example, a dye image-receiving layer is provided by a coating process on a base paper and a protective layer for protecting against abnormal image transfer is formed on the dye image-receiving layer. The protective layer prevents ink from thermally diffusing up to an undesired area at the time of thermal dye transfer. In the present invention, however, no protective layer for protecting against abnormal image transfer is used because a protective area against dye diffusion is formed which prevents dye from thermally diffusing up to an undesired area as a result of the structure of the color filter. Then, the image receiving paper is colored in the thermal dye transfer process. A thermal dye transfer film 2 is a film wherein a stick resistant layer is formed on one side of a base film made of polyethylene terephthalate or the like and a colorant is formed on the other side. The color of a colorant is realized through the color mixing method by using three primary colors of yellow (Y), (C), and magenta (M). The thermal dye transfer technology generally uses two methods according to the types of coloring material. By the first method a coloring material is produced by mixing a colorant such as pigment with, for example, wax. Pigment is transferred to an object to be colored together with the wax through heating. The advantage of using the colorant is that plain paper can be used as the object to be colored. The second method uses a base film coated with a mixture of a sublimatable dye and a binder resin as an ink layer 3. In this case, the object transferred when heated is the dye. The second method uses the sublimation of the dye due to heating. A dye receiving layer requires a transparent macromolecular dyeing resin film layer.

Since the present invention involves a problem concerning the fact that a transparent substrate, such as a glass substrate is used instead of base paper, the method using wax becomes unsuitable from the point of view of the heat resistant characteristic, and so the second method is used as a better choice in accordance with the present invention. Though the present invention uses a thermal head as a heat-generating body 4, it is also possible to use a laser.

An example in which the second method of the thermal dye transfer technology is applied to the color filter of a color liquid crystal display device is shown in the following documents: D. J. Harison and M. C. Olidfield, "The Use of Thermal Dye Transfer Technology for the Fabrication of Color Filter Arrays", Proceeding of the 9th International Congress on Advances in Non-Impact Printing Technologies, pp. 382–384 (1993) and U.S. Pat. No. 5,166, 126.

Though the colored layer of a conventional color filter is fabricated by a method mainly using a photolithography process, as shown in FIG. 16, the method is the primary cause of an increase in cost because it requires a long fabrication process. Moreover, because the photolithography process always includes light exposure processes, the method requires a mask with a higher accuracy as a pattern becomes finer. Furthermore, a development process using liquid chemicals is indispensable in order to pattern a macromolecular layer exposed to light. Furthermore, to form three colored layers of red (R), green (G), and blue (B), a problem arises in that the above exposure and development processes must be repeated at least three times. Furthermore, there are problems that, when they are actually used for a liquid crystal device, the liquid crystal-driving transparent electrodes on a protective overcoat are not properly formed since the three colored layers have different thicknesses because they are separately formed, or a film thickness variation of the liquid crystal LC between pixel elements increases when assembling a liquid crystal device, while maintaining a certain gap with an opposed electrode substrate. For a STN-type liquid crystal device, in particular, it is necessary to further decrease the film thickness variation of the liquid crystal LC compared to a TN-type liquid crystal device in order to improve the response speed and the view angle characteristic. Therefore, if there is film thickness variation of the liquid crystal LC in a certain plane, defective color irregularity occurs at the portions where the thickness is uneven and this is very disadvantageous for stabilization of the optical characteristics.

It is possible to simplify the coloring process by using a conventional thermal dye transfer technology using a sublimatable dye as a fabrication process as shown in FIGS. 18(a) and 18(b). However, because dyeing is performed by dye sublimation employing heat, there is a problem that the dye thermally diffuses from a colored pattern when it is subjected to high temperature and this causes color fading or tone change.

SUMMARY OF THE INVENTION

It is a first object of the present invention to provide a color liquid crystal display device having a high productivity, superior optical characteristics and a high reliability completely meeting the operational environmental conditions required by users, wherein the heat resistance is improved to prevent color mixing of dyes, and the variation of the gap between ITO1 and ITO2, serving as liquid-crystal-driving transparent electrodes in each pixel element, is minimized by using the thermal dye transfer technology as a fabrication process and by using an excellent color filter structure.

A second object of this invention is to provide a method of manufacturing a color filter substrate for the above-mentioned liquid crystal display.

To achieve the above objects, pixel elements of a color filter array of three primary colors are formed by thermal dye transfer. It is a feature of the invention that coloring does not require a mask because there is no exposure process and, for example, data drawn by a computer can directly be transferred. Moreover, the process for forming a black matrix and a transparent conductive electrode uses an ordinary photolithography technique. Furthermore, the materials of a black matrix, a dye receiving layer, a protective overcoat, and a transparent conductive electrode are commercially available materials or those disclosed in the laid-open patent application to be described later. Furthermore, ordinary vapor deposition, sputtering, or a coating method is used to form the black matrix, protective overcoats and transparent conductive electrode films.

Because the layer of three primary color filter patterns is formed by utilizing the sublimation of dye, there is a problem of heat resistance as mentioned above. The heat resistance depends on the components of the protective film formed over the layer of the color filter patterns.

This invention provides a liquid crystal display that realizes high heat resistance, by using for this protective film a metal-containing organic silicon compound that can be hardened by light or heat.

The material of a protective area for protecting against dye diffusion for filling the gap between patterns formed by the above means acts to prevent dyes from horizontally thermally diffusing due to heat and causing color fading or color mixing, though depending on the required heat resistance. Moreover, it has the capability of preventing dyes from vertically thermally diffusing and of compensating the weak point of low heat resistance by covering the colored layer with a transparent protective overcoat formed on the colored layer. Furthermore, the transparent protective overcoat has the characteristic of further covering the colored layer with a thickness almost equal to that of a layer formed by thermal dye transfer technology and of further flattening the surface.

The foregoing and other objects, advantages, manner of operation and novel features of the present invention will be understood from the following detailed description when read in connection with the accompanying drawings.

BRIEF DESCRIPTION OF THE DRAWINGS

FIGS. 13(a)–(f) are sectional views of an essential part for explaining the color filter fabrication process of the present invention;

FIGS. 14(a)–(c) are sectional views of essential parts of an active addressing liquid crystal display device;

DESCRIPTION OF THE PREFERRED EMBODIMENTS

Figure 1:
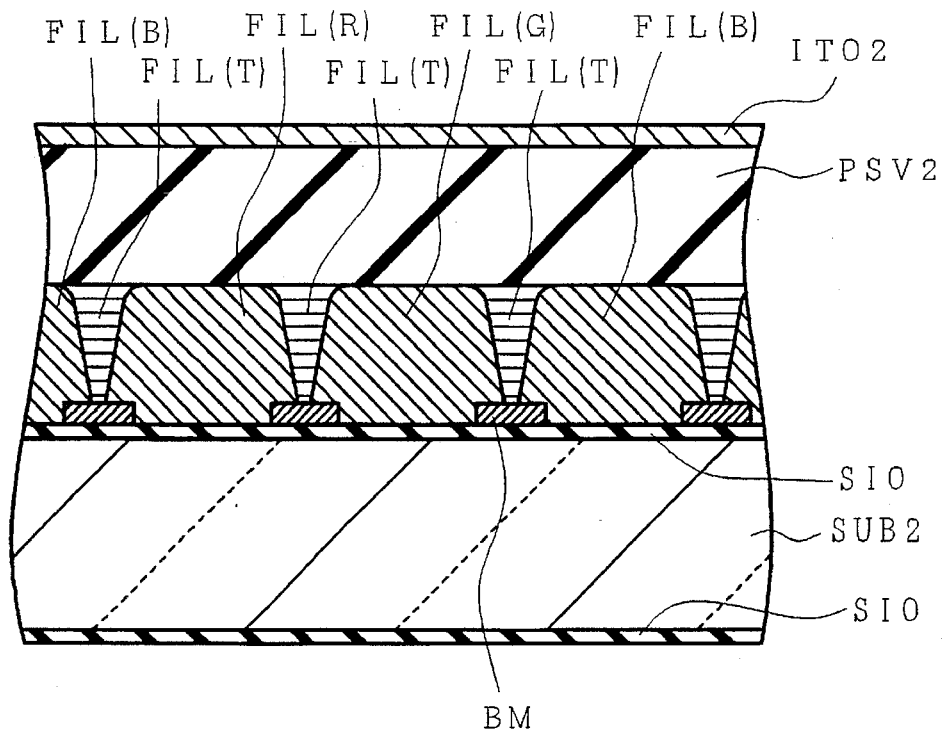
FIG. 1 is a sectional view of an essential part of an embodiment of the color filter structure of the present invention.

The color liquid crystal display device fabricated by the present invention and its typical fabrication method will be described below. In all drawings, parts having the same functions are denoted by the same reference characters and their repetitive description will be omitted.

Embodiment 1

Figure 2:
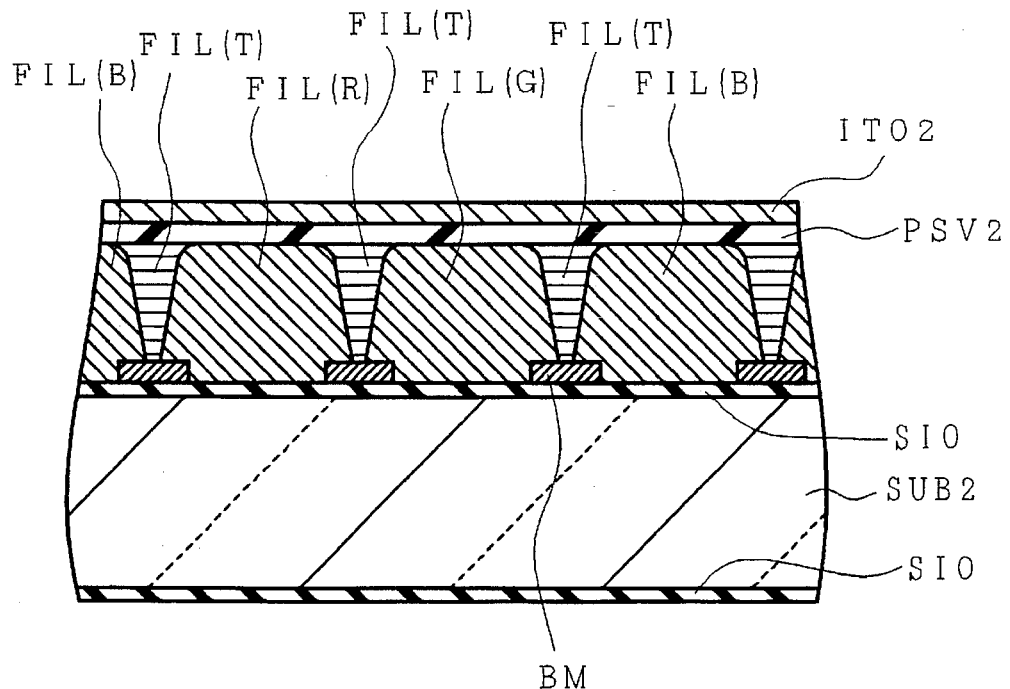
FIG. 2 is a sectional view of an essential part of an embodiment of the color filter structure of the present invention.
Figure 17:
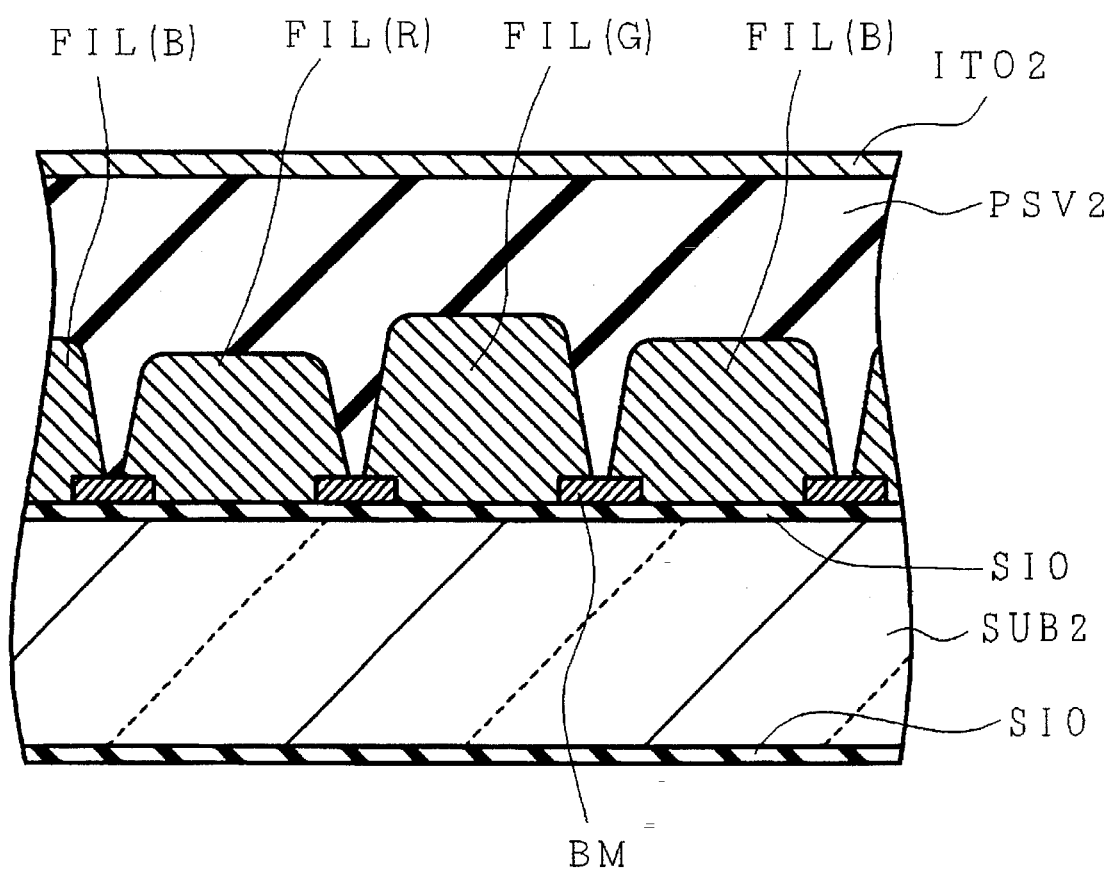
FIG. 17 is a sectional view of an essential part of a color filter fabricated by the conventional fabrication method.
Figure 18:
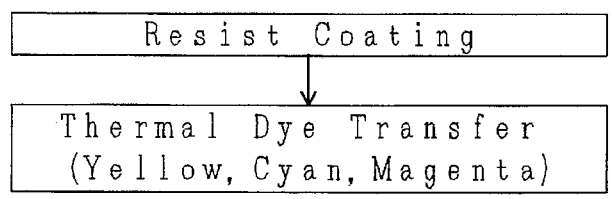
FIGS. 18(a)–(b) are process charts showing the conventional fabrication process according to the thermal dye transfer technology and an illustration showing its fabrication system.
Figure 18:
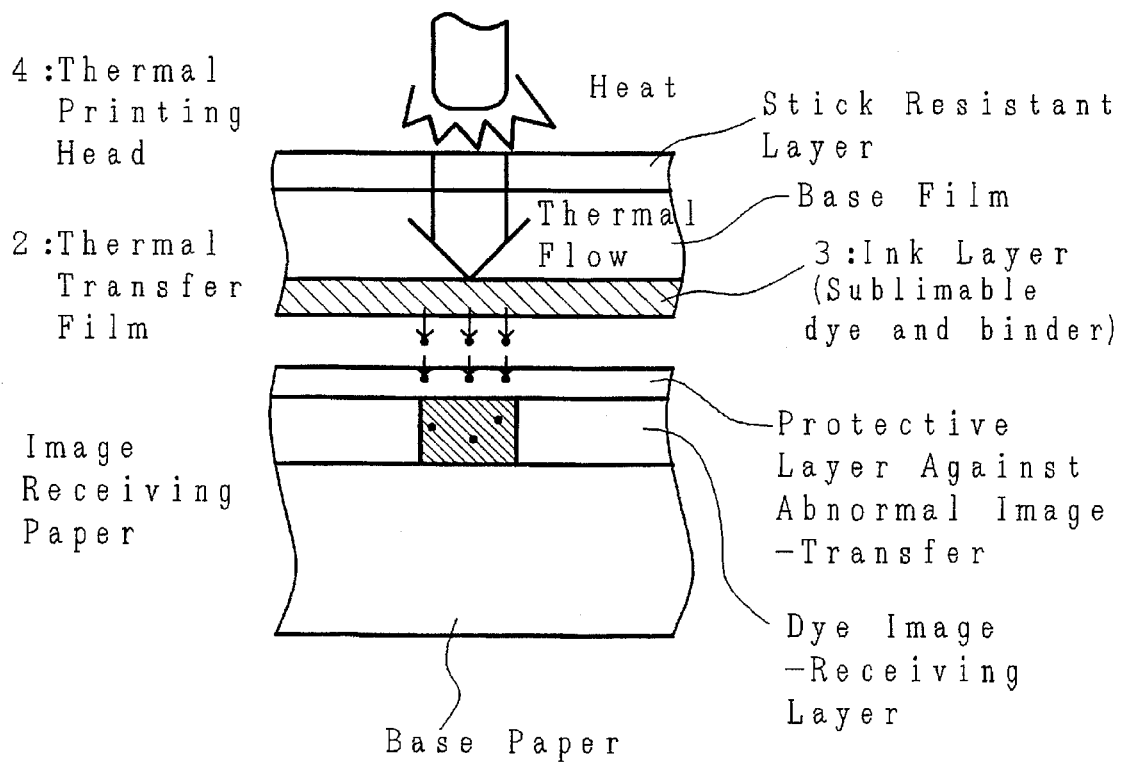

FIGS. 1 to 2 show a sectional view of the color-filter-side substrate of the present invention. Parts having the same functions as those shown in FIG. 17 are denoted by the same reference characters. In FIGS. 1 to 2, FIL denotes a colored layer. However, unlike the case in FIG. 17, FIL(R), FIL(G), and FIL(B) are formed by coloring them in a dye receiving layer 1 and the areas are divided by uncolored portions of FIL(T), so that colors are not superimposed. FIGS. 10(a) to 10(d) show a flow of the process for fabricating the color-filter-side substrate of the present invention. A black matrix BM was formed on a glass substrate SUB2 or on a coating layer SIO on the glass substrate SUB2. This embodiment used a metallic chromium film with a thickness of 800 to 1200 Å, considering the light-shielding effect. Moreover, it was also possible to use a multilayer film made of metallic aluminum, nickel, or chromium oxide and chromium. Furthermore, a photosensitive organic film containing a colorant for blackening could be used. In this case, the film thickness was determined from the transmittance required. As commercially available materials, CK-5001 manufactured by Fuji-Hunt Electronics Technology Co., Ltd. and BKR Series manufactured by Nippon Kasei Chemical Co., Ltd. are examples. Both of them comprise a mixture of carbon and a black pigment or carbon and three-primary-color pigments. The black matrix forming method used a photolithography process in order to improve the whole dimensional accuracy and serve as a reference for forming other pixel elements of the color filter array. As described above, a transparent dye receiving layer 1 having a thickness of up to about 3 μm was provided onto a substrate with a black matrix formed thereon by means of spin coating or the like and thereafter it was dried by heating. Various materials were considered as the material of the dye receiving layer 1. In the case of this embodiment, for the dye receiving layer 1, a resin composition of an aromatic-containing material which had a negative photosensitivity and to which acryloyl group was added was chiefly used. It is possible to use a novolak resin as the aromatic-containing material. These photosensitive resin compositions are disclosed in Japanese Patent Laid-Open Nos. 175753/1992 and 175754/1992. It is also possible to use polycarbonate, vinyl chloride, polyurethane, polyester, polyamide, polyacrylonitrile, and polycaprolactam disclosed in U.S. Pat. Nos. 4,923,860, 4,962,081, and 5,073,534. In this embodiment, it is unnecessary to form a pattern of a colored layer. Therefore, it is also possible to use non-photosensitive materials such as Vilon #200 which is a polyester resin manufactured by Toyobo Co., Ltd., cellulose acetate resin, polystyrene, polypropylene, polyethylene terephthalate, and acrylic resin.

The transparent dye receiving layer 1 was formed on the black matrix BM and thereafter colored by partially heating the layer 1 through the thermal dye transfer film 2 of a polyethylene-terephthalate base film with a thickness of, for example, 4 μm previously coated with a sublimatable dye 3 and using the sublimation property of the dye. The sublimatable dye 3 had to be selected in accordance with the type of the dye receiving layer 1. In this embodiment, as the sublimatable dye 3, a disperse dye and a cation dye manufactured by Nippon Kayaku Co., Ltd. are used. For example, for three primary colors, two sets of dyes were used: One set is Kayaset Red B or Kayaset Scarlet 926 for a red color, a mixture of Kayaset Yellow A–G and Kayaset Blue 714 for a green color, Kayaset Blue 714 for a blue color; and another set is Kayaset Yellow A–G for a yellow color, Kayaset Blue 714 for a cyan color, and Kayaset Red B for a magenta color.

For partial heating, though a thermal head was used as a heat-generating body 4, it was also possible to use a laser. To form a precise pattern, a laser is generally used. In the case of this embodiment, the colored areas FIL(R), FIL(G), and FIL(B) were divided by providing the protective area against dye diffusion with a transparent non-colored area FIL(T), so that color mixing was prevented, because the dye diffusing areas were covered within a black matrix area, even if dyes diffused in the horizontal direction in the sputtering process for forming the transparent conductive electrode ITO2 and in subsequent various annealing processes.

In the case of this embodiment, the edges of the colored areas FIL(R), FIL(G), and FIL(B) were superimposed with the black matrix. However, it was considered that the diffusibility might increase depending on a combination of the sublimatable dye 3 and the dye receiving layer 1. Therefore, it was necessary to further expand the transparent non-colored area FIL(T). Moreover, the transparent protective overcoat PSV2 was formed on the colored layer FIL in order to improve the heat resistance as a color filter. Though depending on a dye receiving material, because a sublimatable dye was used, color fading occurred at the boundary between the colored areas FIL(R), FIL(G), and FIL(B) around the sublimation temperature of the dye and it was observed as a deterioration of a color filter. Therefore, the transparent protective overcoat PSV2 was formed on the colored layer in order to prevent dyes from vertically diffusing or sublimating. Various types of materials were considered as the protective overcoat material. However, to serve as an electrode base film of a liquid crystal device, various chemical and physical characteristics were required of the material; for example, it was possible to form a flat surface with a flatness of 0.2 μm or less, the adhesion to the sealing material SL for bonding upper and lower electrode substrates was good, and the material did not affect the liquid crystal material LC to be sealed in. In this embodiment as shown in FIG. 1, a material obtained by mixing predetermined quantities of amionosilane-modified epoxy resin, ether of novolak resin and glycidyl, novolak resin, and organic solvent, disclosed in Japanese Patent Laid-Open No. 96920/1992 was used and applied up to a thickness of 2 to 3 μm. Moreover, it is possible to use an epoxy-based thermosetting resin with a good adhesion to glass. Because the thermal deformation temperature of the thermosetting resin can be set high, the heat resistance of a color filter is resultingly improved and moreover a sufficient flatness is achieved for the base of the transparent conductive electrode ITO2.

In the embodiment of FIG. 2, because color filters are formed simultaneously, there is no problem with the flatness or vertical difference among the color filters and it is no need for a protective film to have the characteristic of planarization. That is why the film thickness of the protective film can be made thin.

As the protective film material, AR Coat Material P-500S (trade name) (for plastic) of Nissan Kagaku Kogyo make was used. This material with solid component density of 4% was applied by a spin coater at about 200 rpm and the solvent was dried at 80° C. After this, the protective film was irradiated with ultraviolet ray (365 nm) at 3.6 J/cm$^2$. Further, it was heated at 120° C. for 60 minutes for hardening.

Under the above coating condition, the film thickness of about 2000 Å was obtained. Although the heating temperature was 120° C., it may be set higher depending on the dye used for coloring. It is, however, required that the heating temperature be set lower than the sublimation temperature of the dye.

In this embodiment, the transparent conductive electrode ITO2 was formed on the transparent protective overcoat PSV2 through sputtering and a pattern was formed through photolithography. In the case of an active matrix, a portion on which the transparent conductive electrode ITO2 is not formed is previously covered with a frame having an opening at its center and thereafter a film is formed through sputtering, but patterning by photolithography may not be conducted.

Embodiment 2

Figure 3:
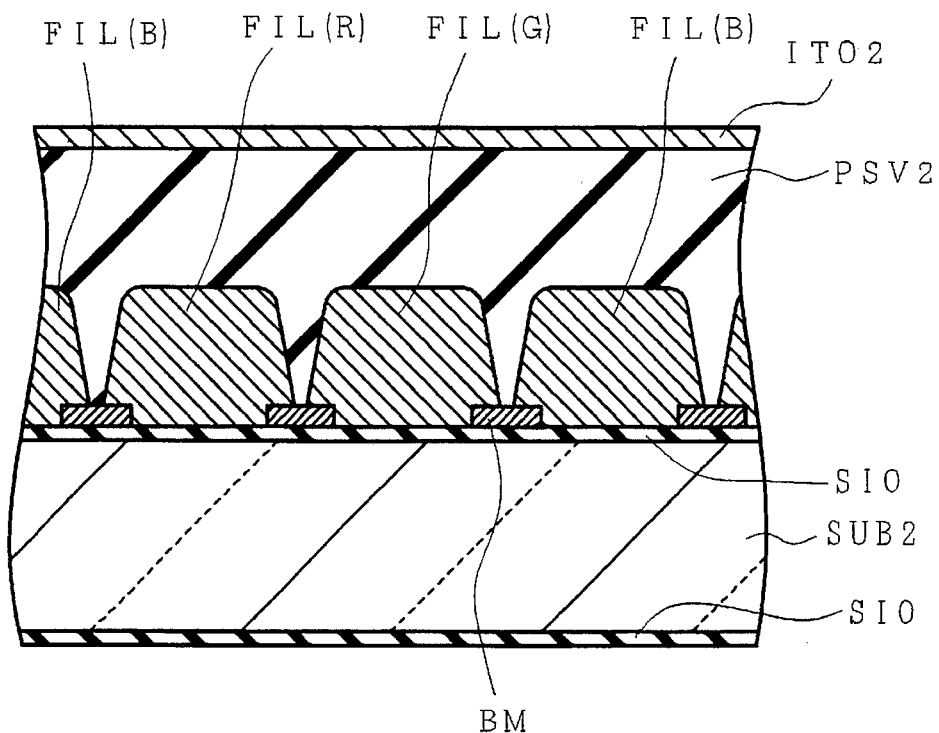
FIG. 3 is a sectional view of an essential part of an embodiment of the color filter structure of the present invention.
Figure 4:
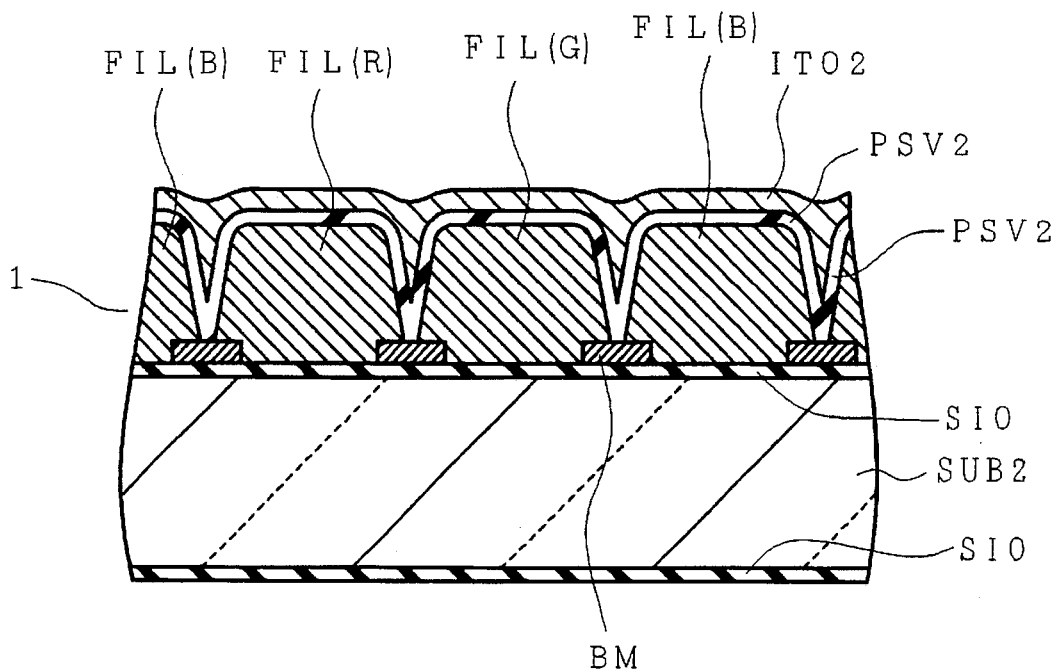
FIG. 4 is a sectional view of an essential part of an embodiment of the color filter structure of the present invention.

Moreover, as an example of improving the heat resistance, FIGS. 3 to 4 show a sectional view of an essential part of a color filter. The following is a fabrication process example, as shown in FIGS. 11(a) to 11(e). A photosensitive resin serving as the transparent dye receiving material 1 was first applied to the black matrix and thereafter the colored layer patterns FIL(R), FIL(G), and FIL(B) corresponding to each pixel element or each color were formed. This embodiment used the photosensitive resin described in Embodiment 1 for the dye receiving material 1. That is, a resin composition of an aromatic-containing material which has a negative photosensitivity and to which an acryloyl group was added was mainly used and applied to a film thickness of about 1 to 1.5 μm through spin-coating or the like. In the case of this embodiment, the patterns of all colors were simultaneously formed as the dye receiving layer 1 by only one photolithography process without repeating the photolithography process for each primary color, unlike the conventional method. A mosaic pattern, or a vertical or a horizontal stripe pattern was formed correspondingly to the color filter array arrangement. The section of three primary color patterns is shown FIGS. 3 to 4 and they are divided into areas by separating patterns for each pixel element or each color by grooves. The coloring method after the separation is the same as the case of (embodiment 1). The thickness of the dye receiving layer 1 can be decreased compared to that of (embodiment 1) because patterns are separated, and consequently thicker coloring is possible. Moreover, to improve the heat resistance as a color filter, a protective overcoat is formed on and between colored patterns. This structure makes it possible to effectively prevent color mixing and color fading of color patterns due to horizontal diffusion of a sublimatable dye caused by various types of heating in the liquid crystal fabrication process after dyeing.

Further, to improve the heat resistance of the color filters, a protective film PSV2 as thin as about 2000 Å, wherein the protective film is a metal-containing organic silicon compound that can be hardened by light and heat, may be formed over the layer of color filter patterns and in their gaps, as shown in FIG. 4. The material of the protective film PSV2 and the method of forming it are similar to those of the Embodiment 1. The process for forming the transparent conductive electrode ITO2 on the transparent protective overcoat PSV2 is the same as that of (embodiment 1).

Embodiment 3

Figure 5:
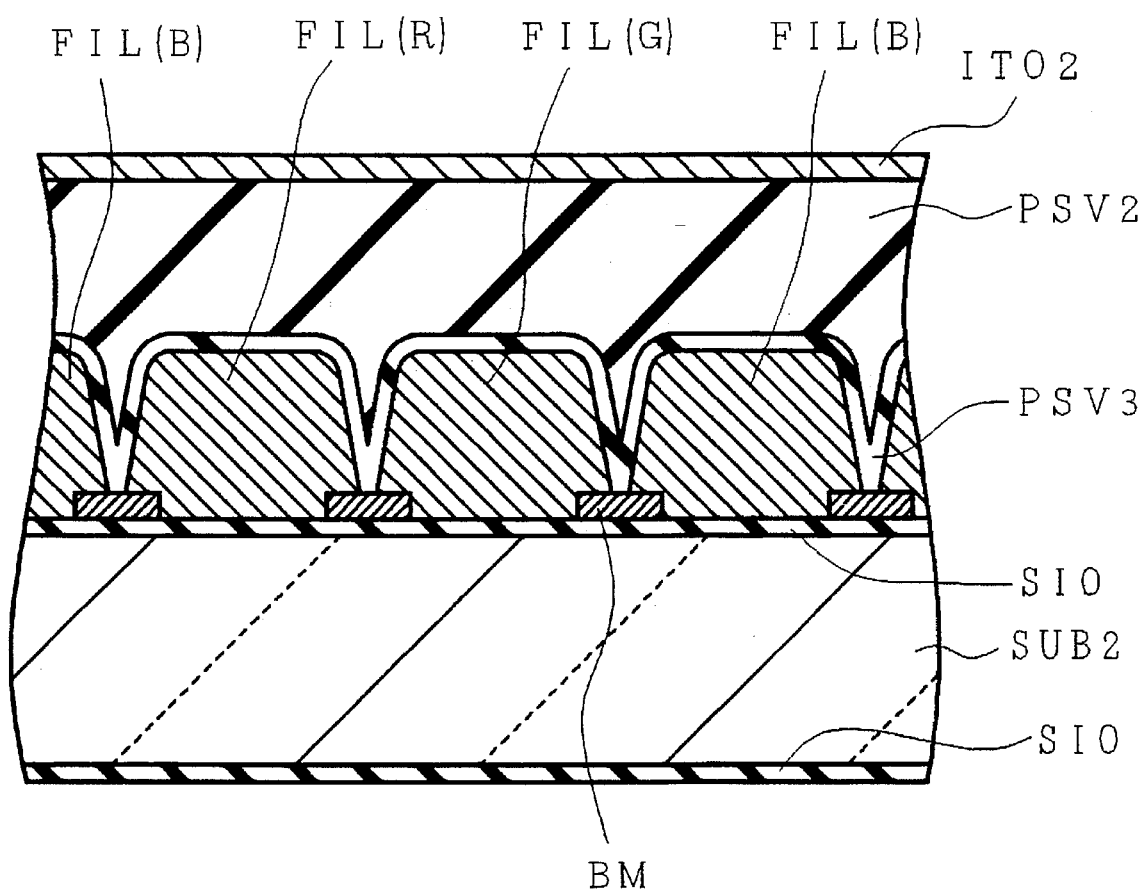
FIG. 5 is a sectional view of an essential part of an embodiment of the color filter structure of the present invention.

In (embodiment 2), colored layer patterns FIL(R), FIL(G) and FIL(B) corresponding to each pixel element or each color were formed. As shown in FIG. 5, however, a second dye diffusion stopper PSV3 was formed on the surface of the colored layers as a transparent inorganic film or an organic film having no dyeing function in order to further improve the dye diffusion preventive effect. In the case of this embodiment, SiO$_2$ was sputtered by a thickness of approx. 100 Å as an inorganic film. However, because it was possible to use any transparent film, the material of the transparent conductive electrode ITO2 can also be used. Though a film thickness of 50 to 100 Å is preferable, any film thickness is acceptable as long as it is possible to prevent dye from diffusing. Though film forming methods include sputtering and vapor deposition, it is necessary to select a method capable of forming a film at a low temperature. Though organic material is considered as the material of the dye diffusion stopper PSV3, it is preferable to select a material with a high transparency and a relatively high crosslinking density. Particularly, an acrylic-based resin is excellent which is used as a surface hardening film of a plastic lens or the like. Moreover, it is possible to use an epoxy-based material by considering the adhesion to the protective overcoat.

After the dye diffusion stopper PSV3 was formed, the transparent protective overcoat PSV2 was formed in order to improve the flatness between pixel elements. The transparent protective overcoat PSV2 used the material described in (embodiment 2). Moreover, the transparent conductive electrode ITO2 was formed on the transparent protective overcoat PSV2. Though a method and a structure for directly forming an electrode layer on the dye diffusion stopper PSV3 can be used, the structure in which the transparent protective overcoat PSV2 is formed is better when considering the flattening between pixel elements.

Embodiment 4

Figure 6:
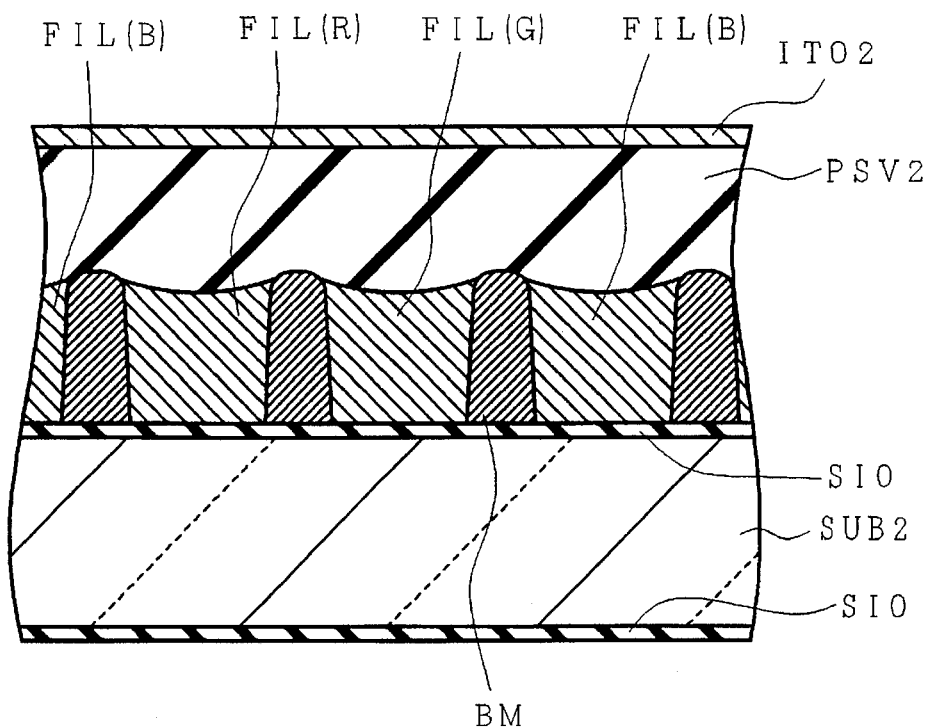
FIG. 6 is a sectional view of an essential part of an embodiment of the color filter structure of the present invention.
Figure 7:
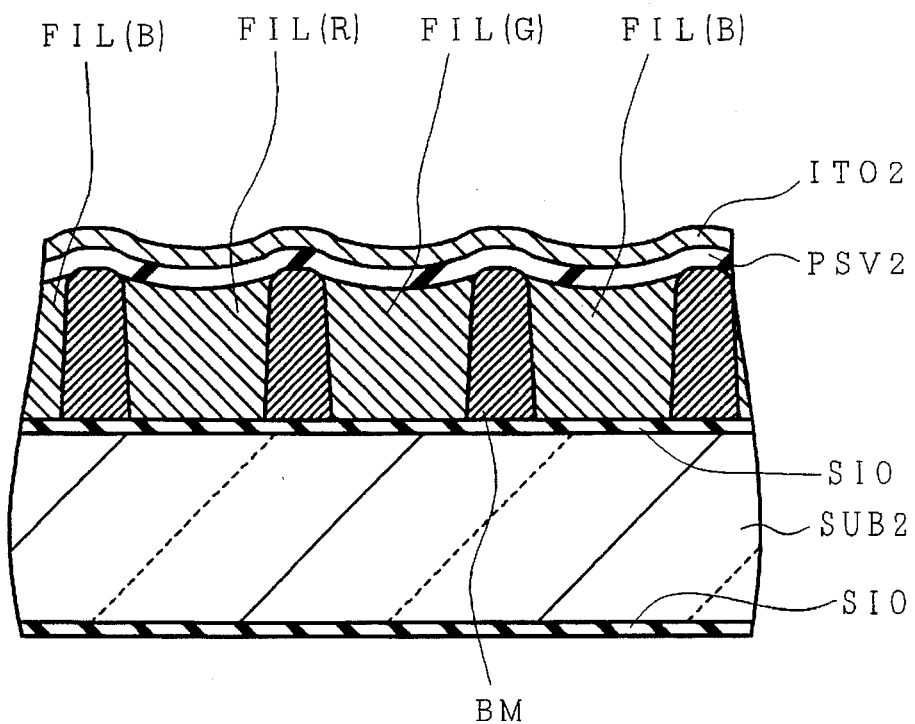
FIG. 7 is a sectional view of an essential part of an embodiment of the color filter structure of the present invention.

By filling the protective area against dye diffusion between colored patterns with a black matrix material superior in the heat resistance and having a low transmittance, it is possible to prevent the dye in a colored layer from diffusing in the lateral direction. FIGS. 6 to 7 show a sectional view of an essential part of the structure of a color filter according to this embodiment. FIGS. 12(a) to 12(e) show an example of the fabrication process. This embodiment used CK-5001 on the market manufactured by Fuji-Hunt Co., Ltd. or BKR Series on the market manufactured by Nippon Kasei Chemical Co., Ltd. for the black matrix material. Both were a mixture of carbon and a black pigment or, carbon and three-primary-color pigments, which comprises a photosensitive material to be cross-linked when exposed to light. A black matrix pattern was formed by photolithography so as to improve the whole dimensional accuracy and to serve as a reference for forming other pixel elements. The formed black matrix can be heated in an oven and stabilized so that it is not deformed or does not cause color fading due to subsequent thermal treatment. The film thickness of a black matrix is determined by the light-shielding characteristic of the black matrix, which is an optical characteristic. In the case of this embodiment, the film thickness was set to about 1.0 to 1.5 μm. As described above, the transparent dye receiving layer 1 was formed onto the substrate with the black matrix previously formed on it. For the dye receiving layer 1, a resin composition of an aromatic-containing material which had a negative photosensitivity and to which an acryloyl group was added was used and applied through spin-coating.

After the dye receiving layer 1 was applied, three primary color patterns were simultaneously formed by using the pattern of the black matrix BM instead of a mask through one exposure and one development process by means of back exposure to ultraviolet rays from an ultraviolet-ray source 5. In this case, it is desirable to remove the dye receiving material 1 from the outside of the outermost pattern of the black matrix BM because it may enter an effective pixel element section as foreign matter when cutting the substrate. In this embodiment, a square black light-shielding frame was provided between the dye receiving layer 1 and the ultraviolet ray source 5 to cover the dye receiving layer 1 so that ultraviolet rays pass through only the central opening during the exposure and strike at and around the pixel element forming portion. By this method, the dye receiving material 1 around the pixel element forming portion was removed simultaneously with the pattern formation of various colors at the time of development. For example in FIG. 6, the ultraviolet irradiation intensity and the development time were so determined that the difference in the film thickness between the black matrix and the dye receiving layer 1 after development was 0.5 μm or less. The method for coloring patterns into various colors hereafter was the same as the case of (embodiment 1). Moreover, a protective overcoat was formed on a colored layer in order to improve the heat resistance as a color filter. According to the above structure, the colored layer for each color was divided by a previously formed black matrix, so that color mixing due to diffusion of dyes in the same plane could be prevented as shown in FIGS. 6 to 7.

In the example of FIG. 7, the ultraviolet radiation intensity and the development time are set so that the difference in film thickness between the black matrix and the dyed layer 1 after development is less than 0.1 μm. The subsequent coloring process of each color filter pattern is similar to that of the first embodiment.

Further, as shown in FIG. 7, a protective film PSV2 as thin as about 2000 Å, wherein the protective film is a metal-containing organic silicon compound that can be hardened by light and heat, is formed over the layer of color filter patterns and black matrix in a way described in the Embodiment 1 to improve the heat resistance of the color filters.

With this structure, the color patterns that form the color filters FIL(R), FIL(G), FIL(B) are separated from each other by a preformed black matrix BM, as shown in FIG. 7, so that unwanted color mixing due to dispersion of dyes on the same plane can be prevented. Further, to improve the heat resistance of the color filters, a protective film PSV2 is formed over the layer of color patterns and the black matrix layer, after which a transparent electrode ITO2 is formed over the protective film PSV2 as by sputtering.

The color pattern layer and the black matrix layer according to this embodiment have the best flatness characteristic.

While the vertical difference was set to 0.1 μm in the example of FIG. 7, it can be set below 0.05 μm. Reduced vertical difference between the color pattern layer and the black matrix layer is advantageous to the formation of the protective film, making it possible to prevent any cracks of protective film PSV2 caused by differences of physical property between different materials. Furthermore, a transparent protective overcoat PSV2 was formed on the colored layer and the black matrix layer in order to improve the heat resistance as a color filter and thereafter the transparent conductive electrode ITO2 was formed on the transparent protective overcoat PSV2 by sputtering or the like. This embodiment makes it possible to ensure the heat resistance because the black matrix BM pattern serves as a layer for preventing dyes from diffusing in the lateral direction. Moreover, a dye receiving material can be patterned by the back exposure method in a self-alignment manner, the pattern accuracy is improved, and the number of processes decreases. Furthermore, the difference in the film thickness of the patterns of the dye receiving layer from that of the BM pattern can be kept small. Therefore, it can be said that this is the optimum method.

Embodiment 5

Figure 8:
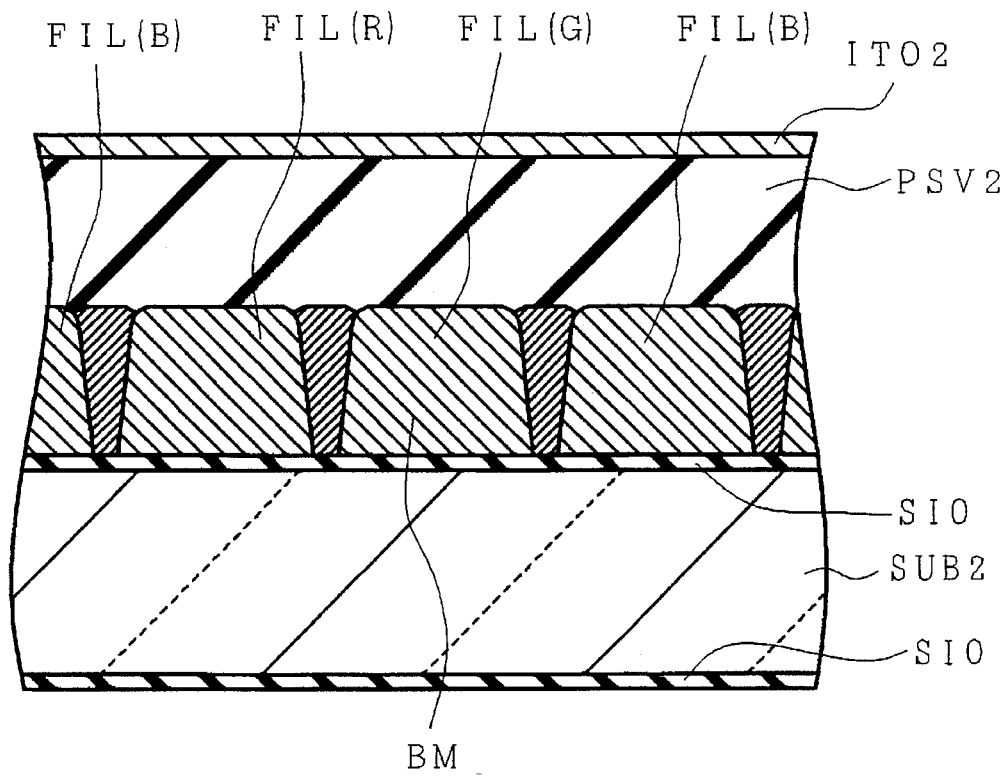
FIG. 8 is a sectional view of an essential part of an embodiment of the color filter structure of the present invention.
Figure 9:
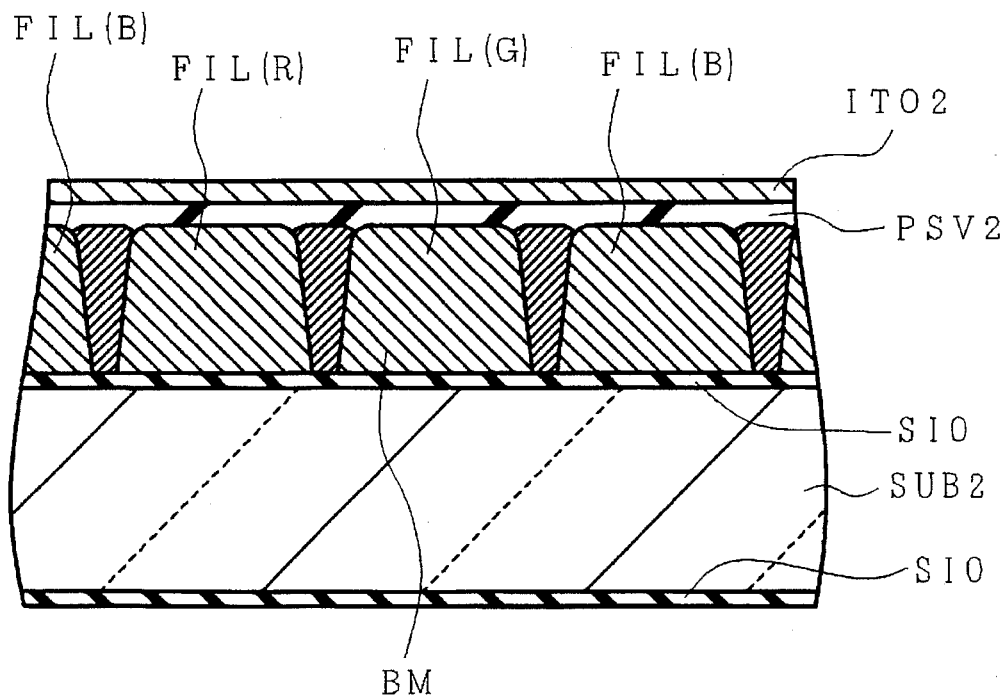
FIG. 9 is a sectional view of an essential part of an embodiment of the color filter structure of the present invention.
Figure 10A:
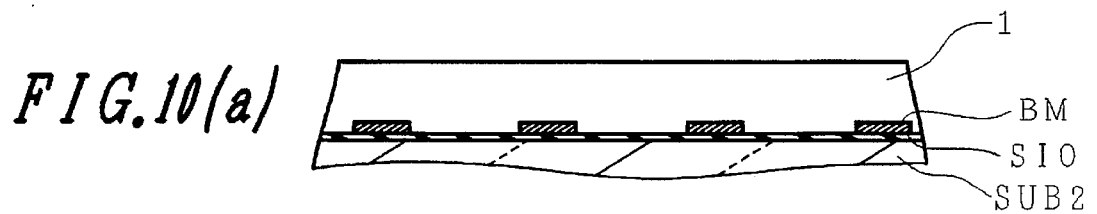
FIGS. 10(a)–(d) are sectional views of an essential part for explaining the color filter fabrication process of the present invention.
Figure 10B:
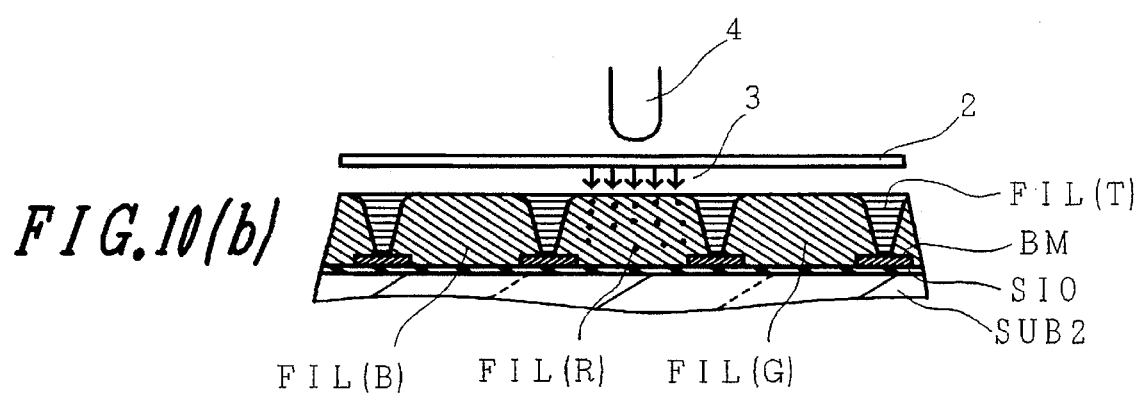
Figure 10C:
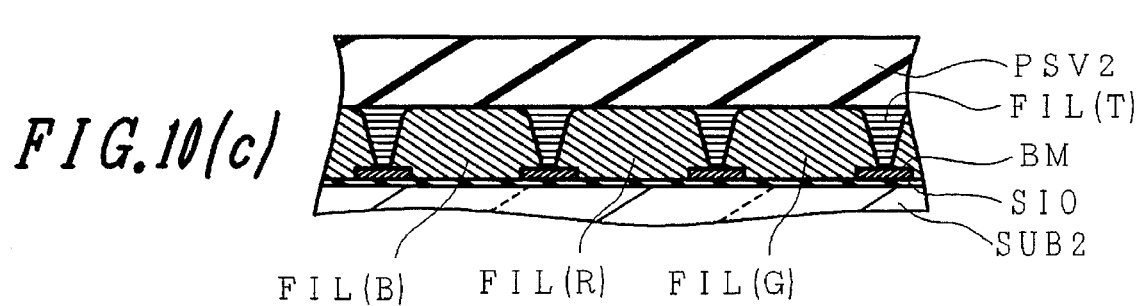
Figure 10D:
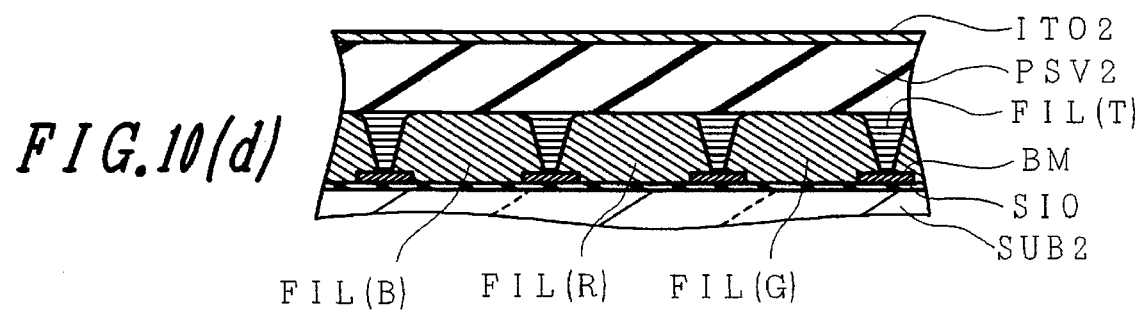
Figure 11A:
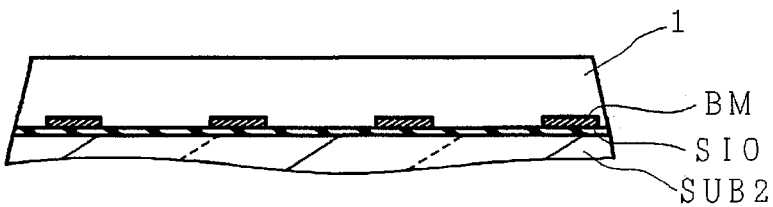
FIGS. 11(a)–(e) are sectional views of an essential part for explaining the color filter fabrication process of the present invention.
Figure 11B:
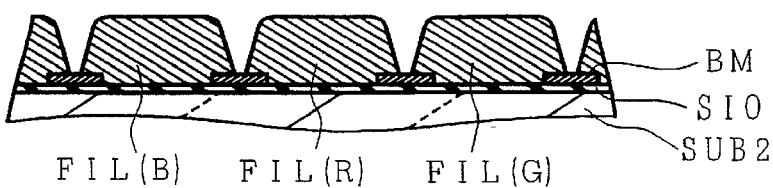
Figure 11C:
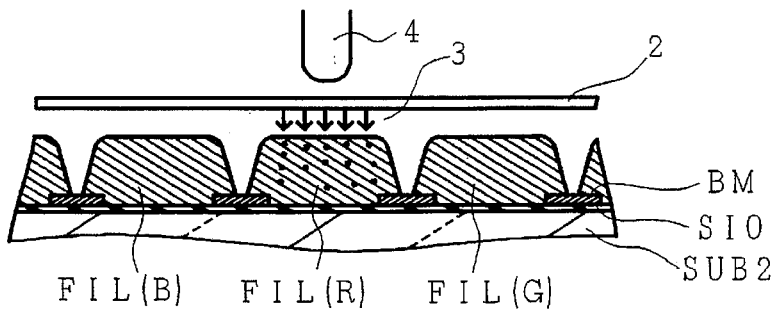
Figure 11D:
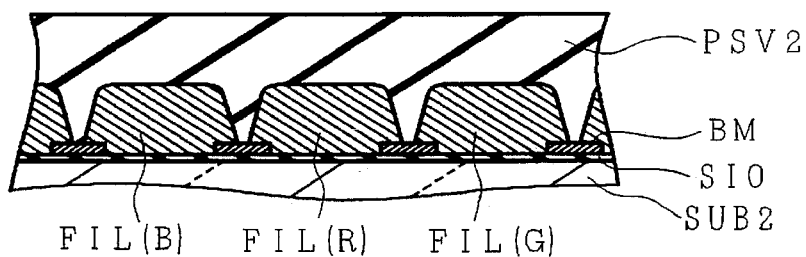
Figure 11E:
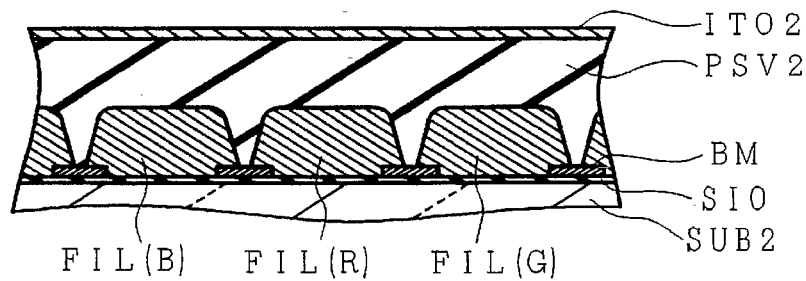
Figure 12A:
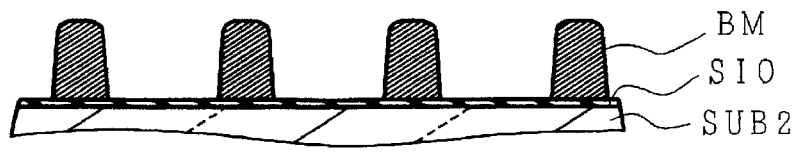
FIGS. 12(a)–(e) are sectional views of an essential part for explaining the color filter fabrication process of the present invention.
Figure 12B:
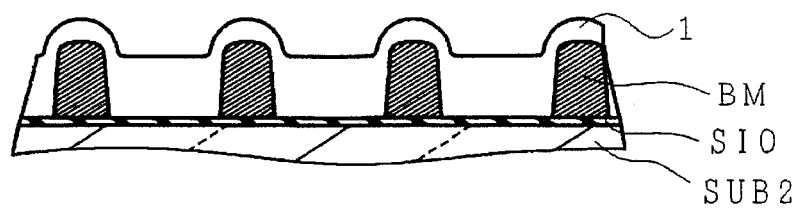
Figure 12C:
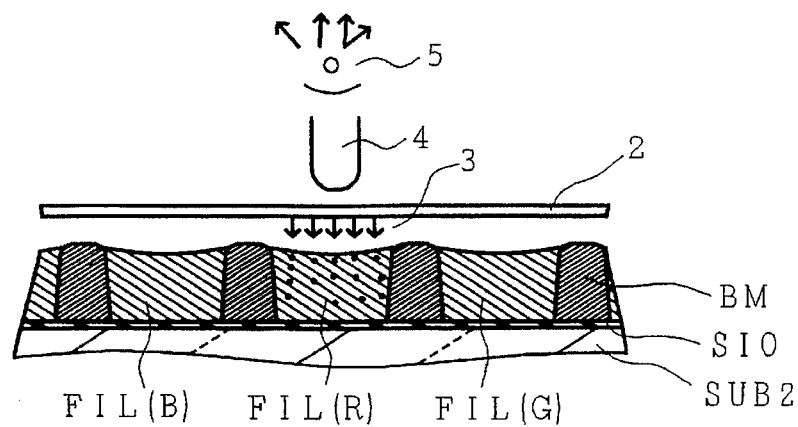
Figure 12D:
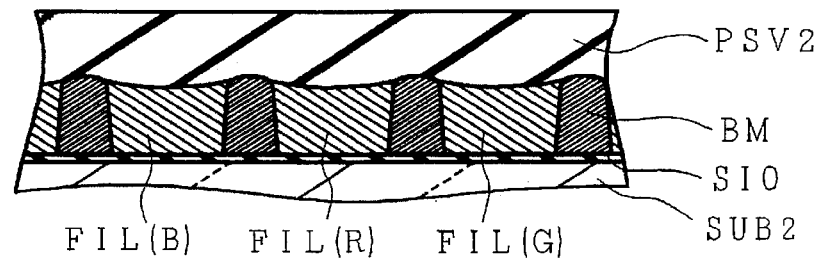
Figure 12E:
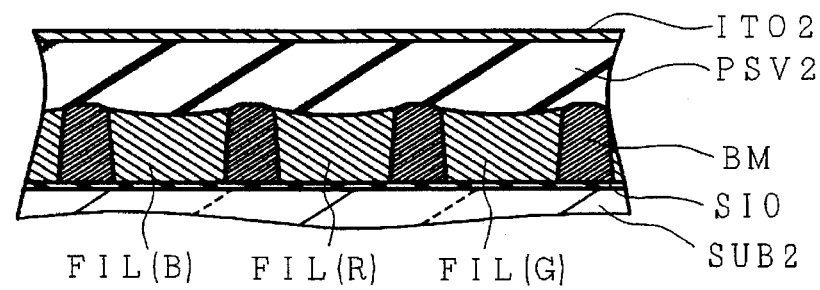
Figure 15:
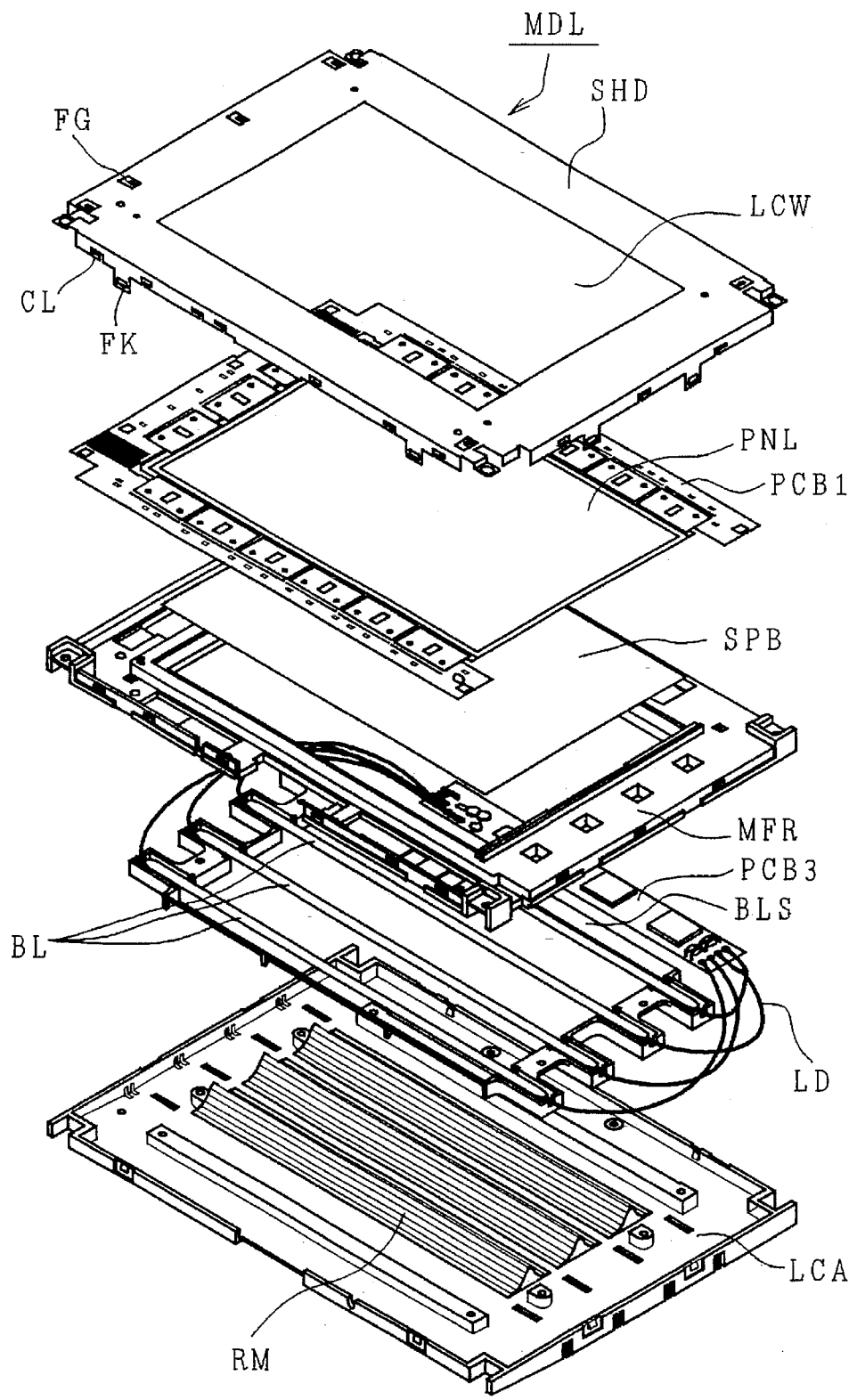
FIG. 15 is an exploded perspective view showing constitutional parts of a liquid crystal module that uses a TFT type liquid crystal display as an example of the color liquid crystal display that applies this invention.
Figure 16:
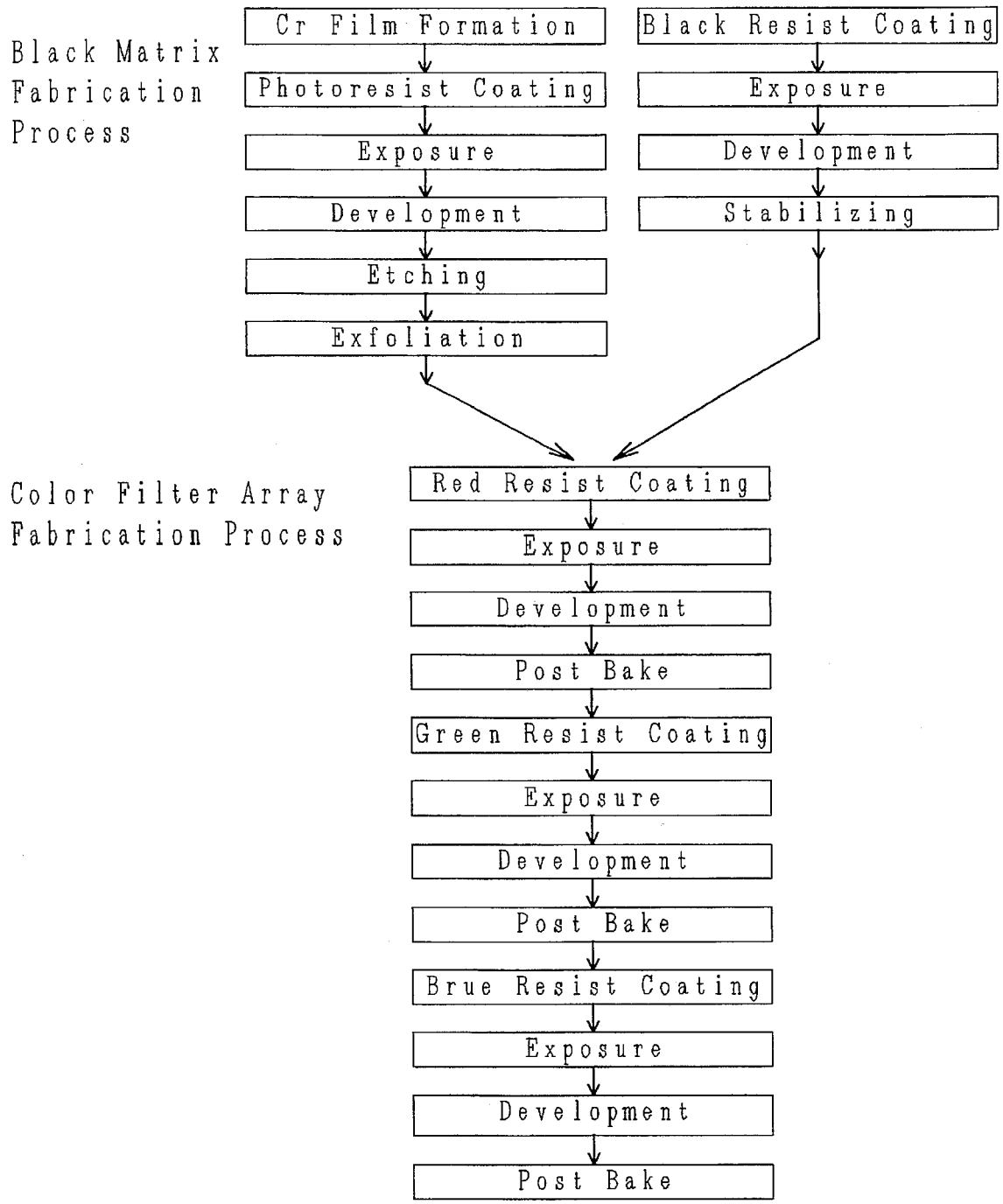
FIG. 16 is a process chart showing a conventional color filter fabrication method.

Though (embodiment 4) used a process of forming a black matrix and thereafter forming a colored layer, it is possible to reverse the process. FIGS. 8 to 9 show a sectional view of an essential part of the structure of the color filter of this embodiment. An example of the fabrication process is shown in FIGS. 13(a) to 13(f), in which the dye receiving layer 1 was first applied onto a transparent substrate in a range of film thickness of around 1.0 to 1.5 μm through spin-coating or the like. Thereafter, patterns corresponding to three primary colors were formed through exposure and development using an ordinary photolithography. In this case, the patterns were formed by setting gaps between the patterns and dividing them into areas. The method for coloring patterns into various colors hereafter was the same as the case of (embodiment 1). In the next process, a photosensitive black macromolecular material was applied by spin-coating or the like. The material shown in (embodiment 4) can be used as a black matrix material. Then, the photosensitive black macromolecular material in the gaps between three primary color patterns was cured by applying ultraviolet rays to the material from the glass substrate SUB2 side with the color patterns formed on it. Thereafter, unnecessary black macromolecular resin was removed by a developer. The ultraviolet exposure and the development time were adjusted so that the difference in the film thickness of the three primary color patterns from that of the BM pattern was 0.5 μm or less because the film thickness of the black macromolecular material from the transparent substrate was also adjusted. Moreover, a transparent protective overcoat PSV2 was formed on the colored layer and black matrix in order to improve the heat resistance as a color filter.

Further, to improve the heat resistance of the color filters, a protective film PSV2 as thin as about 2000 Å, wherein the protective film is a metal-containing organic silicon compound that can be hardened by light and heat, may be formed over the color pattern layer and the black matrix layer, as shown in FIG. 9. The material of the protective film PSV2 and the method of forming it are similar to those of the Embodiment 1.

Hereafter, the process for forming a transparent conductive electrode ITO2 on the transparent protective overcoat PSV2 through sputtering or the like was the same as that of (embodiment 1).

As described above, the color liquid crystal display device of the present invention and its fabrication method make it possible to dye a dye receiving layer through a dry process by using a sublimatable dye, so as to greatly simplify and shorten the fabrication process. As a result, the cost can greatly be cut down. The optical characteristics of the device are superior to those of a system using pigment because dye is used. Moreover, three primary color patterns have the same film thickness. Furthermore, it is possible to further improve the flatness of the films because they are covered with a protective overcoat, and to minimize the variation of the gaps between top and bottom substrates, which is the major factor influencing the optical characteristics of a liquid crystal device when fabricating it. As a result, it is possible to control the variation of the optical characteristics, such as the contrast in the liquid crystal device. Moreover, it is possible to improve a low heat resistance of the sublimatable dye, which is a disadvantage of the dye by forming a protective area against dye diffusion between color patterns of a colored layer and covering the color patterns with a material of high heat resistance.

Furthermore, the low heat resistance, the weak point of the sublimating dye, can be improved by forming a dye prevention area between the color patterns that form the color filters and by coating the color patterns with a metal-containing organic silicon compound with good heat resistance that can be formed at low temperatures and hardened by light and heat.

We claim:

1. A color liquid crystal display having a color filter substrate, comprising:
    a black matrix deposited over a substrate;
    a layer of three primary color patterns colored by thermal dye transfer technology;
    a dye prevention area filling gaps between the color patterns; and
    a transparent protective film formed over the color pattern layer and the dye prevention area;
    wherein the protective film is a metal-containing organic silicon compound that can be hardened by light and heat.

2. The color liquid crystal display according to claim 1, wherein said black matrix is formed of a metal film.

3. The color liquid crystal display according to claim 1, wherein said black matrix is formed of a material with low light transmittivity.

4. The color liquid crystal display according to claim 1, wherein the three primary color patterns are provided in a transparent dye receiving layer, a remaining portion of the transparent dye receiving layer, not containing the three primary color patterns, filling the dye prevention area filling gaps between the color patterns.

5. The color liquid crystal display according to claim 1, wherein said black matrix is a layer of black matrix material, with edges of the primary color patterns being provided on the layer of black matrix material.

6. The color liquid crystal display according to claim 1, wherein the transparent protective film has a flatness of 0.2 µm or less.

7. The color liquid crystal display according to claim 1, wherein the dye prevention area filling gaps between the color patterns is filled with the transparent protective film.

8. A color liquid crystal display having a color filter substrate, comprising:
    a black matrix deposited over a substrate;
    a layer of three primary colored patterns colored by thermal dye transfer technology, the colored patterns being separated by gaps; and
    a transparent protective film formed over the colored patterns and the black matrix;
    wherein the protective film is a metal-containing organic silicon compound that can be hardened by light and heat.

9. The color liquid crystal display according to claim 8, wherein said gaps separating said colored patterns are filled with said transparent protective film.

10. The color liquid crystal display according to claim 9, further comprising a dye diffusion stopper layer provided between said colored patterns and said transparent protective film.

11. The color liquid crystal display according to claim 8, further comprising a dye diffusion stopper layer on the colored patterns, to prevent diffusion of dye from respective colored patterns.

12. The color liquid crystal display according to claim 8, wherein said gaps separating said colored patterns are filled with said black matrix.

13. The color liquid crystal display according to claim 12, wherein said black matrix prevents diffusion of dye in a direction between colored patterns.

14. The color liquid crystal display according to claim 12, wherein a difference in thickness of the black matrix filling the gaps and of the colored patterns is at most 0.1 µm.

15. The color liquid crystal display according to claim 8, wherein said black matrix is formed of a metal film.

16. The color liquid crystal display according to claim 8, wherein said black matrix is formed of a material with low light transmittivity.

17. A method of manufacturing a color filter substrate of a color liquid crystal display, the color filter substrate including three primary color filters separated by a black matrix on a transparent substrate that forms the color liquid crystal display, comprising at least:
    a black matrix forming process to form a black matrix on the transparent substrate, using a macromolecular material containing a material with a low transmittivity;
    a dye receiving layer pattern forming process, which includes coating a transparent dye receiving layer of a negative photosensitive resin over the black matrix, sensitizing the dye receiving layer by a back exposure method, which radiates light from a side of the transparent substrate opposite the black matrix forming surface to harden the dye receiving layer, and developing the dye receiving layer to form dye receiving layer patterns corresponding to three primary colors;
    a coloring process to color the dye receiving layer patterns in three primary colors by thermal dye transfer technology to make them colored patterns; and
    a protective film forming process to form over the colored patterns produced by the coloring process a protective film made from a metal-containing organic silicon compound that can be hardened by light or heat.

18. A method according to claim 17, wherein a difference in thickness between the colored patterns of three primary colors and the black matrix film, respectively formed in the coloring process and in the black matrix forming process, is less than 0.1 µm.

19. A method according to claim 17, wherein the coloring process includes applying a laser beam to a thermal dye transfer film to transfer dye to the transparent dye receiving layer to color the dye receiving layer in three primary colors.

20. A method of manufacturing a color filter substrate of a color liquid crystal display, the color filter substrate including three primary color filters separated by a black matrix on a transparent substrate that forms the color liquid crystal display, comprising at least:

a dye receiving layer pattern forming process to form over the transparent substrate dye receiving layer patterns which are separated by gaps;

a coloring process to color the dye receiving layer patterns in three primary colors by thermal dye transfer technology to make them colored patterns;

a black matrix forming process which includes coating a macromolecular material containing a material with a low transmittivity over the colored patterns produced by the coloring process, radiating light from a side of the transparent substrate opposite the black matrix forming surface to harden the macromolecular material filling the gaps between the colored patterns, and developing the macromolecular material to form a black matrix; and a protective film forming process to form over the colored patterns produced by the coloring process a protective film made from a metal-containing organic silicon compound that can be hardened by light or heat.

21. A method according to claim 20, wherein the coloring process includes applying a laser beam to a thermal dye transfer film to transfer dye to the transparent dye receiving layer to color the dye receiving layer in three primary colors.

22. A color liquid crystal display having a color filter substrate, comprising:

a layer of three primary colored patterns colored by thermal dye transfer technology, the colored patterns being separated by gaps and are provided overlying a substrate;

a black matrix filling said gaps; and a transparent protective film overlying said layer of three primary colored patterns and said black matrix; wherein the protective film is a metal-containing organic silicon compound that can be hardened by light and heat.

23. The color liquid crystal display according to claim 22, further comprising a transparent electrode formed over the protective film.

24. The color liquid crystal display according to claim 22, wherein a difference in thickness between the black matrix filling said gaps and the layer of three primary colored patterns is at most 0.1 μm.

25. The color liquid crystal display according to claim 1, further comprising a transparent electrode over the protective film.

26. The color liquid crystal display according to claim 8, further comprising a transparent electrode over the protective film.

* * * * *